United States Patent [19]

Lopez

[11] Patent Number: 4,803,794
[45] Date of Patent: Feb. 14, 1989

[54] FISHING ROD HOLDER FOR ATTACHMENT TO DOCKS

[76] Inventor: Xavier B. P. Lopez, 22980 NW. Dogwood, Orenco, Oreg. 97124

[21] Appl. No.: 24,972

[22] Filed: Mar. 12, 1987

[51] Int. Cl.⁴ ............................................. A01K 97/10
[52] U.S. Cl. ..................................... 43/21.2; 248/538
[58] Field of Search .................. 43/21.2; 248/520, 538

[56] References Cited

U.S. PATENT DOCUMENTS

| | | | |
|---|---|---|---|
| D. 219,972 | 2/1971 | Bennett et al. | 43/21.2 |
| 3,484,066 | 12/1969 | Aunspaugh | 43/21.2 X |
| 4,106,811 | 8/1978 | Hernandez | 43/21.2 X |
| 4,156,982 | 6/1979 | Phillips, Jr. | |
| 4,159,816 | 7/1979 | Miyamae | |
| 4,235,409 | 11/1980 | Cummings | 248/538 |
| 4,271,549 | 6/1981 | Chandler | 114/61 X |
| 4,366,640 | 1/1983 | Clapp | |
| 4,551,939 | 11/1985 | Kitchens | 43/21.2 |
| 4,603,500 | 8/1986 | Harrison, Sr. | |
| 4,637,156 | 1/1987 | Simmons | 43/21.2 |

Primary Examiner—Nicholas P. Godici
Assistant Examiner—Carmine Cuda
Attorney, Agent, or Firm—Henderson & Sturm

[57] ABSTRACT

A fishing rod holder for use on a dock of a type having a plurality of spaced apart planks for providing a horizontal surface for people to walk upon and dock their boat against. The fishing rod holder has a base member which is substantially wider than the distance between adjacent planks on an average dock. The bottom of the base member is substantially flat and fits on top of the planks. A tubular member is rigidly secured to the top of the base member for allowing a fishing rod handle to be inserted therein. A hole extends through the base member and has an anchor bolt extending therethrough. The anchor bolt has longitudinal axis having threads formed therearound at the top of the anchor bolt. The anchor bolt has a loop on the lower end thereof. The horizontal width of the loop is narrow enough to permit the loop to pass between a space between adjacent planks on a dock in one orientation of the anchor bolt about the longitudinal axis. The horizontal length of the anchor bolt is longer than the predetermined distance between the adjacent planks to prevent the anchor bolt from passing between the planks in a second orientation of the anchor bolt about the longitudinal axis. A wing nut, which is internally threaded, is provided for threadably engaging the threads on the upper end of the anchor bolt whereby rotation of the wing nut in one direction forces a loop toward the base member to tighten the base member against the dock and rotation of the wing nut in an opposite direction loosens the base member from the planks on the dock.

3 Claims, 1 Drawing Sheet

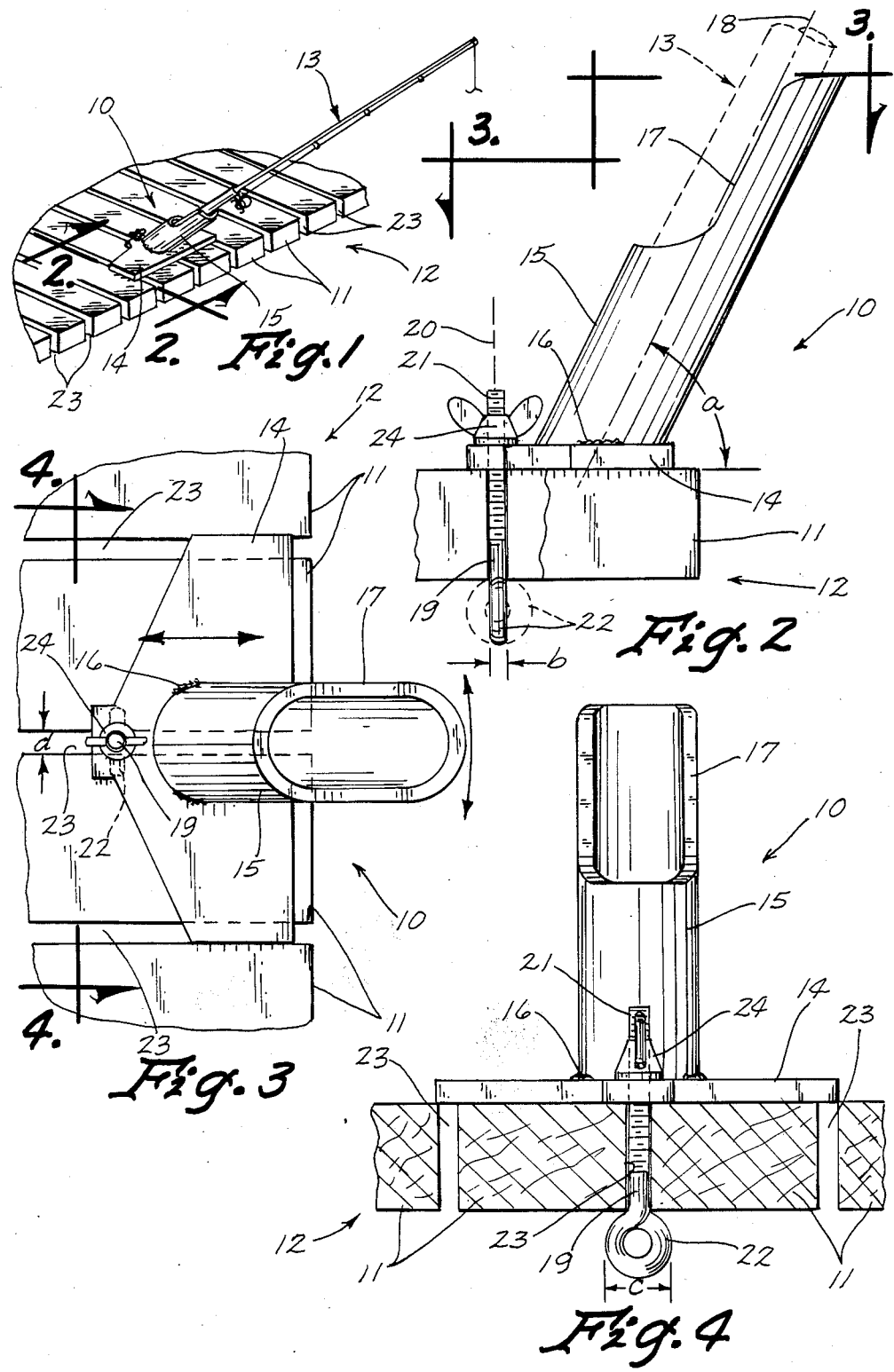

4,803,794

FISHING ROD HOLDER FOR ATTACHMENT TO DOCKS

TECHNICAL FIELD

The present invention relates generally to fishing rod holders, and more particularly to a fishing rod holder for attachment to a dock.

BACKGROUND ART

When fishing from shore, it is common for fishermen to put a forked stick in the ground to hold the top of the pole upward. When the fish pulls on the line, the fisherman can see the end of the pole move and can grasp the pole, hook the fish and pull the fish in.

When fishing from a dock, however, the forked stick apparatus is not useful so the fisherman must use other alternatives. One alternative is to merely hold the fishing pole, which is extremely tiring. Another alternative is to lay the fishing pole on the dock, but then the fishing pole gets in the way of foot traffic, is not readily accessible other than by stooping down rapidly in order to hook a fish and there is a considerable danger that a fish may pull the fishing pole into the water off of the top of the dock since there is nothing there to hold the fishing pole to prevent that from happening.

Fishermen have been known to cut holes in a dock in order to provide a place for putting the handle of the fishing pole in order prevent the aforementioned problems.

Consequently, there is a need for a fishing pole holder for use on docks which will overcome the aforementioned problems.

DISCLOSURE OF THE INVENTION

The present invention relates to a fishing rod holder for use on a dock of a type having a plurality of spaced apart planks for providing a horizontal surface for people to walk upon and dock their boat against. The fishing rod holder has a base member which is substantially wider than the distance between adjacent planks on an average dock. The bottom of the base member is substantially flat and fits on top of the planks. A tubular member is rigidly secured to the top of the base member for allowing a fishing rod handle to be inserted therein. A hole extends through the base member and has an anchor bolt extending therethrough. The anchor bolt has a longitudinal axis having threads formed therearound at the top of the anchor bolt. The anchor bolt has a loop on the lower end thereof. The loop has a horizontal length and a horizontal width. The horizontal width is narrow enough to permit the loop to pass between a space between adjacent planks on a dock in one orientation of the anchor bolt about the longitudinal axis. The horizontal length of the anchor bolt is longer than the predetermined distance between the adjacent planks to prevent the anchor bolt from passing between the planks in a second orientation of the anchor bolt about the longitudinal axis. A wing nut, which is internally threaded, is provided for threadably engaging the threads on the upper end of the anchor bolt whereby rotation of the wing nut in one direction forces a loop toward a base member to tighten the base member against the dock and rotation of the wing nut in an opposite direction loosens the base member from the planks on the dock.

An object of the present invention is to provide an improved fishing rod holder.

Another object of the present invention is to provide a fishing rod holder which is easily and quickly attached or detached from a dock.

A further object of the present invention is to provide a fishing rod holder of the aforementioned type which can be swiveled around 360°.

A still further object of the present invention is to provide a fishing rod holder of the aforementioned type which securely holds the handle of a fishing rod but permits it to be removed quickly and easily.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention shown in use on a dock extending from the shore and out into the water;

FIG. 2 is a side elevational view of a preferred embodiment of the present invention shown in FIG. 1;

FIG. 3 is a top view taken along line 3—3 of FIG. 2; and

FIG. 4 is a view taken along line 4—4 of FIG. 3.

BEST MODE FOR CARRYING OUT THE INVENTION

Referring now to the drawings, wherein like reference numerals designate identical or corresponding parts throughout the several views, FIG. 1 shows a fishing rod holder (10) constructed in accordance with the present invention and being attached to planks (11) of a dock (12). Fishing rod holder (10) is shown having a fishing rod (13) disposed therein in a position for deployment.

The fishing rod holder (10) includes a base member (14) having a tubular member (15) rigidly secured thereto. The base member (14) and the tubular member can be made of any one of a number of materials such as metal or plastic. Portion (16) would be a weld for fusing the base member (14 and 15) together if they are made of metal and this portion (16) would be some other form of adhesive joint if plastic or the like is used to construct the base member (14) and tubular member (15). The tubular member (15) is disposed at an angle "a", for example as shown in FIG. 2, with respect to the flat base of the base member (14). This angle "a" is ideally 20° so the pole will be held mostly upwardly, but somewhat outwardly. A cut-out portion (17) on the tubular member (15) is provided for allowing the fishing pole handle to be easily inserted or withdrawn from the tubular member (15), but yet will support the underside of the fishing pole handle and prevent the bottom of the fishing pole handle from pivoting when a fish pulls on the line attached to the fishing pole (13). The tubular member (15) has a longitudinal axis (18).

An anchor bolt (19) extends through a hole in the base member (14) and has a longitudinal axis (20). Threads (21) are formed on an upper portion of the anchor bolt (19) and a loop (22) is formed on the bottom thereof. The loop (22) has a horizontal width "b" as shown in FIG. 2, and the horizontal length "c" as shown in FIG. 4. The horizontal width "b" of the loop (22) is less than a predetermined distance "d" between the planks (11) as shown in FIG. 3 and the horizontal length "c" as shown in FIG. 4 of the loop (22) is greater than the predetermined distance "d" between the planks (11) as shown in FIG. 3.

In operation, the fishing rod holder (10) would be placed on a dock in the position shown in FIGS. 1 and 3 and the loop (22) would be turned such that it will pass down through space (23) between adjacent planks (11) on the dock (12), for example as shown in shown in dashed lines in FIG. 2. After the loop (22) is positioned completely below the planks (11), for example as shown in FIG. 2, then it is turned 90° from the position shown in dashed lines in FIG. 2 to the position shown in solid lines in FIGS. 2 and 4, after which a wing nut (24) is turned in one rotational direction in order to pull the loop (22) up against the bottom of the planks (11), for example as shown in FIG. 4.

The fishing rod holder (10) is then ready to have the fishing rod (13) inserted therein, for example as shown in FIG. 1. It will be understood of course that the fisherman would first cast a baited hook and line into the water first before inserting it into the holder (10) as shown in FIG. 10. Typically, the line would be tightened up to some extent so the user can wait until a fish pulls on the line. Upon seing that a fish is biting, the fisherman can quickly and easily grab the pole (13) and it can be easily removed and pulled backwardly to hook the fish because of the cut-out portion (17) in the top of the tubular member (15).

Another feature of the fishing rod holder (10) is that by loosening the wing nut (24) to some extent, the base member (14) and tubular portion (15) can be rotated about the horizontal axis (20) of the anchor bolt (19) so as to position it in any desired position. This is particularly useful when a boat pulls up beside the dock (12) and the fishing pole (13) needs to be moved out of the way to some extent. Of course, the wing nut (24) will be tightened down to hold the base member (14) in any particular desired position.

When the fisherman desires to quit fishing, the wing nut (24) is loosened, the top of the bolt (21) is grasped and turned to the position shown in dashed lines in FIG. 2, and the loop (22) can then be pulled up through the space (23) between adjacent planks (11). Consequently, it will be appreciated that the fishing rod holder (10) can easily and quickly be attached or detached from any dock having planks with spaces therebetween within a range of sizes. This is also done without any damage to the docks, whether they are private or public.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practised otherwise than as specifically described.

I claim:

1. A fishing rod holder in combination with a dock of a type having a plurality of spaced apart planks for providing a horizontal surface for people to walk upon; wherein said fishing rod holder consists of:

a base member, said base member being substantially wider than a predetermined distance between adjacent planks on an average dock, said base member being substantially flat on the bottom thereof;

holding means of a tubular shape integrally attached at a lower end to the top of said base member whereby said lower end is closed by said base member for holding the handle of a fishing rod;

a hole extending through said base member, said hole being spaced from said rod holding means;

an anchor bolt having a longitudinal axis and extending through said hole in said base member, said anchor bolt having a loop on the lower end thereof and threads on the upper end thereof, said loop having a horizontal length and a horizontal width, said horizontal width being narrow enough to permit said loop to pass between a space of said predetermined distance between adjacent planks on a dock in one orientation of said anchor bolt about said longitudinal axis with respect to said planks, said horizontal length of said anchor bolt being longer than a said predetermined distance between adjacent planks to prevent said anchor bolt from passing between said planks in a second orientation of said anchor bolt about said longitudinal axis; and, wing nut means for selectively threadably engaging the threads on the upper end of said anchor bolt whereby rotation of said wing nut means forces said loop toward said base member and rotation of said wing nut means in an opposite direction causes said loop to move away from said base member.

2. The fishing rod holder of claim 1 wherein said holding means comprises a tubular member having a longitudinal axis which is 20° with respect to a horizontal plane whereby a fishing rod can be held upwardly and outwardly from a dock when in use.

3. The fishing rod holder of claim 2 wherein a lower portion of said tubular member is circular in cross-section and an upper section of said tubular member is semi-circular in cross section whereby the handle of a fishing rod will be held in place against the force of a fish pulling on a hook and line attached to said fishing rod, but allowing quick and easy removal of said rod handle from said holding means.

* * * * *